No. 853,942. PATENTED MAY 14, 1907.
A. CAMPBELL.
SEED COTTON DRYING AND CLEANING APPARATUS.
APPLICATION FILED FEB. 21, 1906.
3 SHEETS—SHEET 2.
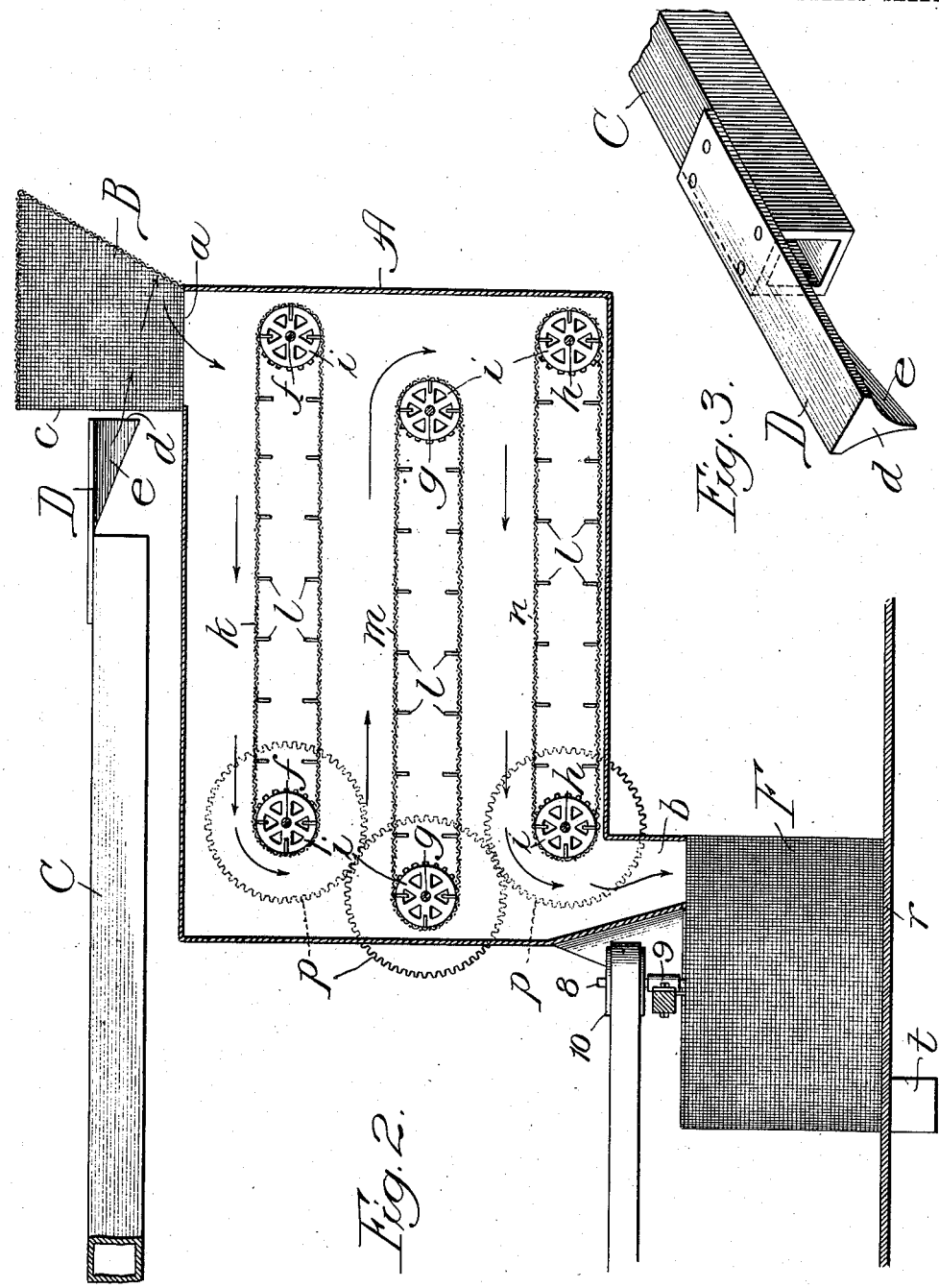
Witnesses:
Inventor:
Angus Campbell,
By Dyrenforth, Dyrenforth & Lee,
Attys No. 853,942. PATENTED MAY 14, 1907.
A. CAMPBELL.
SEED COTTON DRYING AND CLEANING APPARATUS.
APPLICATION FILED FEB. 21, 1906.
3 SHEETS—SHEET 3.
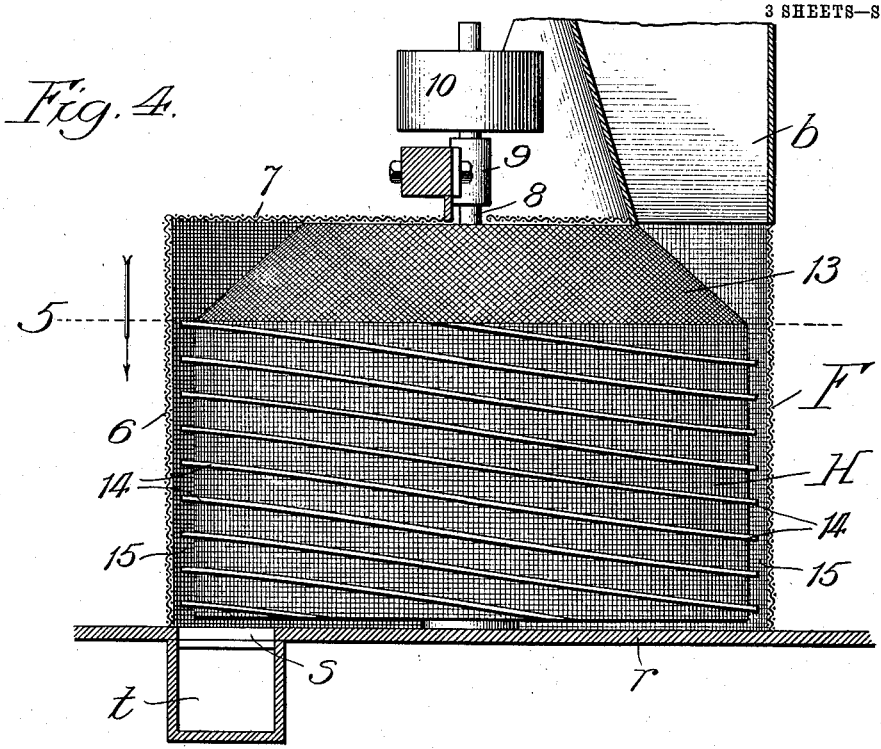
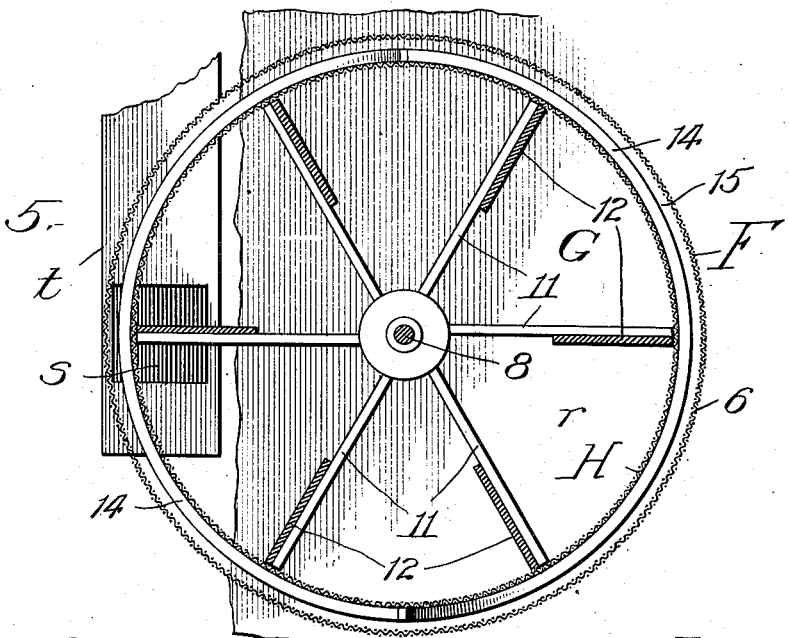
Witnesses:
Inventor:
Angus Campbell,
By Dyrenforth, Dyrenforth & Lee,
Attys

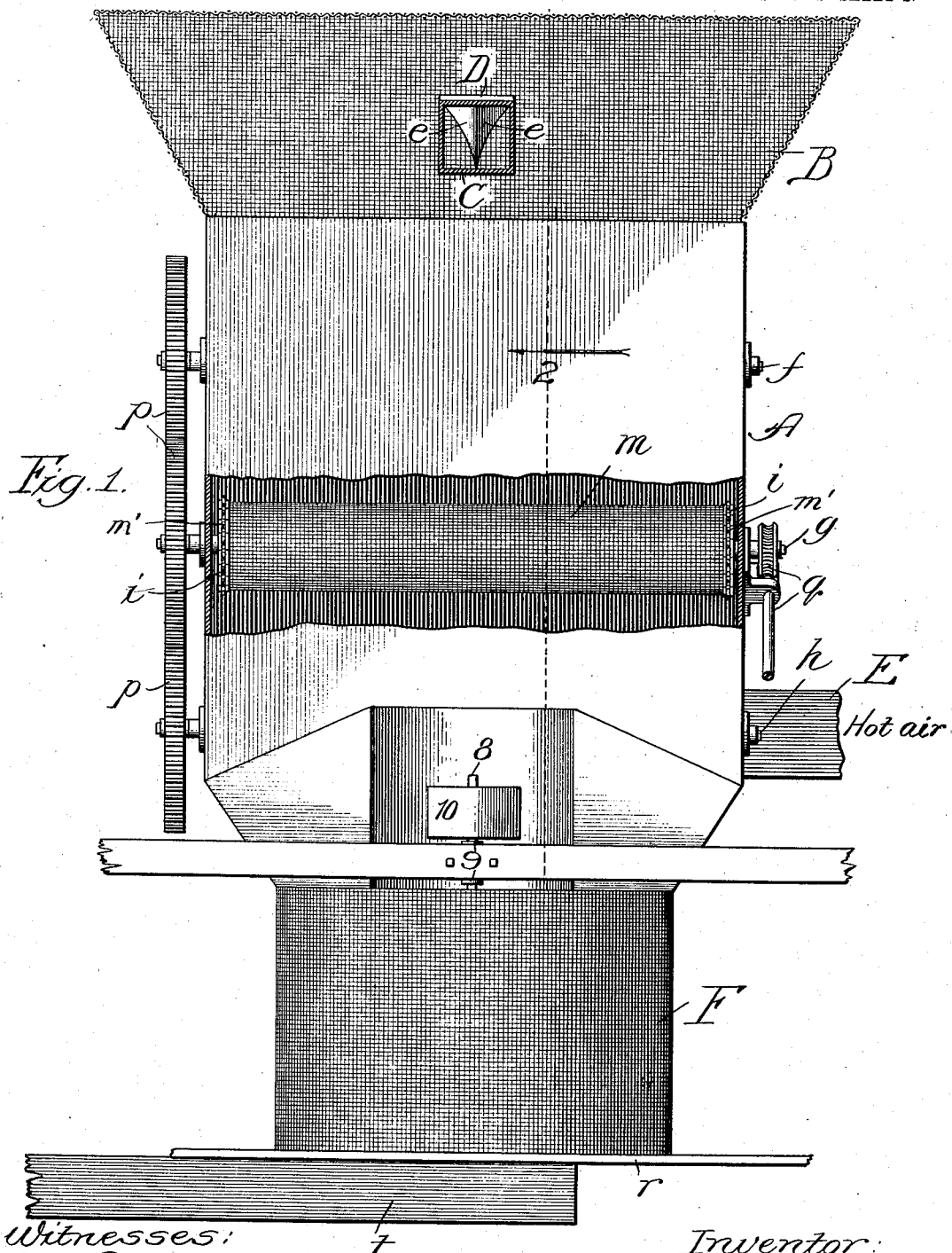

UNITED STATES PATENT OFFICE.

ANGUS CAMPBELL, OF PITTSBURG, PENNSYLVANIA.

SEED-COTTON DRYING AND CLEANING APPARATUS.

No. 853,942.          Specification of Letters Patent.          Patented May 14, 1907.

Application filed February 21, 1906. Serial No. 302,253.

*To all whom it may concern:*

Be it known that I, ANGUS CAMPBELL, a citizen of the United States, residing at Pittsburg, in the county of Allegheny and State of Pennsylvania, have invented a new and useful Seed-Cotton Drying and Cleaning Apparatus, of which the following is a specification.

My object is to provide cotton-cleaning apparatus of improved construction for eliminating dead leaves, dust, sand and other trash from seed cotton before ginning, without unduly threshing the cotton or injuring its fibers.

My improved cleaning apparatus may in practice be interposed in a pneumatic conveying tube or conduit through which the cotton is passed from, say, a store-house to the gin-house.

In connection with my improved cleaning apparatus I prefer to provide improved cotton-drying means to co-operate therewith.

In the drawings—Figure 1 is a broken end elevation of the drying and cleaning apparatus; Fig. 2, a reduced section taken on line 2 in Fig. 1; Fig. 3, a broken perspective view of the end portion of a section of the cotton-conveying tube adjacent to the drying-apparatus inlet; Fig. 4, an enlarged, broken and partly sectional view of the cotton cleaner; and Fig. 5, a broken plan section taken on line 5 in Fig. 4.

A is a cotton drier comprising a rectangular casing having an inlet $a$ in the top at one end and an outlet chute $b$ at its opposite lower end. Above the inlet $a$ is a screen structure or deflector B, which may be of the upwardly flaring shape indicated, and formed of coarse wire mesh at the top and three sides, being open at the side $c$. The conveyer tube C, extending from a store-house, or the like, not shown, terminates short of the opening $c$ about mid-way of the sides thereof. On the end of the said tube is a spreader D flaring downward and toward the opening $c$ to present the V-shaped end $d$ and concave tapering sides $e$ forming the spreading blade.

Journaled in the walls of the receptacle or drier A, in the positions shown, are upper shafts $ff$ in the same horizontal plane, intermediate shafts $g$ $g$ and lower shafts $h$ $h$ all provided with sprocket wheels $i$. Surrounding the sprocket-wheels on the shafts $f$ is an endless belt $k$ of mesh-wire reinforced at intervals on its inner side by means of transverse slats $l$. A similar belt $m$ surrounds the sprocket-wheels $i$ of the shafts $g$ and a similar belt $n$ surrounds the sprocket-wheels $i$ of the shafts $h$. The belts $k$, $m$, $n$ are provided at opposite edges with chains, or the like, $m^1$, as indicated in Fig. 1, which engage the teeth of the sprocket-wheels; and the reinforcing slats $l$ are somewhat shorter than the width of the belts so as to pass readily between the sprocket-wheels. On adjacent shafts of the pairs $f$ $g$ $h$ at the outer side of the casing are gear-wheels $p$ meshing with each other, one of said shafts being driven from a power appliance, not shown, through a worm and worm-gear $q$ as indicated, for example, in Fig. 1. The belts are driven at comparatively slow speed in the directions indicated by arrows in Fig. 2. Entering one side of the receptacle A at the base thereof is a hot-air supply-conduit E.

In practice the cotton, from the store-house or otherwise, is driven, as by a fan-blower, through the tube C and as it escapes from the mouth thereof it impinges against the under-side of the flaring spreader D which operates to spread it out over the opening $a$. Quite a percentage of the dust and other trash may be blown out of the cotton as the latter strikes the mesh-wire walls of the part B, and as the cotton accumulates there it falls through the opening $a$ onto the traveling belt $k$. From the said belt it drops to the belt $m$ and from the latter to the belt $n$ whence it is delivered to the chute $b$. The hot air from the pipe E fills the receptacle A, rising through the screens and cotton thereon to dry the same; and the speed of the conveyer belts is regulated to subject the cotton to the action of the hot air for a time amply sufficient to cause all moisture to be extracted.

The cleaner F has a base $r$ provided with an opening $s$ leading to a pneumatic tube or conduit $t$, which may extend to the gin-house and be provided with a suction fan, or the like, capable of drawing and conveying the cotton through the tube.

The cleaning apparatus is of cylindrical form, with an outer cylindrical wall 6 and a top 7, both of coarse wire screen of about one-quarter inch mesh. The chute $b$ enters the top of the receptacle toward the side, as indicated in Fig. 4. Journaled in the base $r$ at the center of the receptacle and passing vertically upward through the top 7 is a shaft 8 provided above its bearing 9 with a pulley 10. Fastened to the shaft are two or more wheels G having radial spokes 11; and fastened to the spokes near their outer ends are vertical vanes 12. Surrounding the wheels G and fastened thereto is an inner cylinder H having a tapering top-portion 13, all formed of wire mesh. In practice the periphery of the cylinder H may be about two inches from the surrounding wall or cylinder 6. Fastened to the cylindrical wall H on the outer side thereof are narrow spiral blades 14, which extend from the base of the tapering portion 13 to the lower end of the cylinder H and pass around the same about three times. The blades 14 are parallel with each other and project approximately half way across the space 15 between the cylindrical walls H and 6. The pulley 10 is belted to a suitable driving power, not shown, and through the shaft 8 rotates the wheels G and surrounding mesh-wire cylinder H and attendant parts at a comparatively high speed. In this rotation a strong current or blast of air is set up by the vanes 12, the air entering through the top 7 and passing outward through the cylindrical screen H across the annular space or passage 15 between the walls H 6 and through the wall 6.

As the dried cotton falls through the chute b onto the rotating tapering portion 13 it descends into the annular space 15, being carried down at comparatively slow speed by the engagement therewith of the spirals 14. The cotton is thus spread, as it descends, in a thin layer against the wall 6, against which the blast set up by the vanes is directed. The air-current thus forced through the cotton blows trash from the cotton through the screen wall 6, so that by the time the cotton reaches the base r it is thoroughly cleaned, or approximately so. As the cotton is moved around to the opening s it falls into the tube t and is conveyed thereby to the gin-house.

The action upon the cotton fibers in the descent of the cotton is very gentle, and the fibers are neither injured nor threshed to any material extent.

What I claim as new and desire to secure by Letters Patent is—

1. In a pneumatically operated cotton cleaning apparatus, the combination of an outer chamber, a screen forming the vertical surrounding wall of said chamber, a rotary vertical cylinder within said chamber having an upwardly tapering top-portion, a screen forming the vertical surrounding wall of said cylinder beneath said top-portion, the cylinder being supported in the chamber to leave an annular passage for the cotton between the said walls, means for directing a blast of air from the cylinder across said passage and through the said chamber-wall, means for feeding the cotton onto said tapering top-portion of the cylinder whereby it is directed into said passage to descend through the same, and rotating means for the cylinder.

2. In a pneumatically operating cotton-cleaning apparatus, the combination of a vertical cylindrical chamber, a screen forming the surrounding wall of said chamber, a rotary vertical cylinder within said chamber, a screen forming the surrounding wall of said cylinder, the cylinder being supported in the chamber to leave an annular passage for the cotton between the walls, a spiral guide for the cotton in said passage, means for directing a blast of air from the cylinder across said passage and through the said chamber-wall, means for feeding the cotton to said passage, and rotating means for the cylinder.

3. In a pneumatically operating cotton-cleaning apparatus, the combination of an outer cylindrical chamber, a screen forming the surrounding wall of said chamber, a blast-creating fan in said chamber having a cylindrical screen forming a surrounding wall about said fan, the walls forming an annular passage between them for the cotton, and means for rotating the fan and its cylindrical wall to set up and direct a blast of air across said passage and through the outer wall.

ANGUS CAMPBELL.

In presence of:
A. H. MOESER,
FRED W. ASSEL.